2,755,298

METHOD OF SYNTHESIZING ARYL ACRYLONITRILES

Norman Whittaker, London, England, assignor to Burroughs Wellcome & Co. (USA), Inc., Tuckahoe, N. Y., a corporation of New York No Drawing. Application May 24, 1954, Serial No. 432,019

Claims priority, application Great Britain May 26, 1953

6 Claims. (Cl. 260—465)

The present invention relates to the manufacture of acrylonitriles of value in the synthesis of pyrimidine derivatives.

Certain pyrimidine derivatives falling within the general Formula I are known to have valuable antimalarial properties. In this formula R is hydrogen or an alkyl group having from one to four carbon atoms and W and Z are either both hydrogen or halogen atoms or one is a halogen atom and the other is hydrogen.

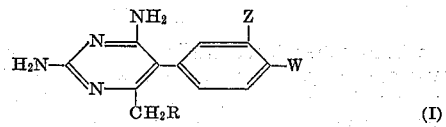

These pyrimidine derivatives may be made by a reaction sequence illustrated by the Formulae II to VI, in which the symbol Ar is used to denote the phenyl or substituted phenyl group in Formula I, the group R has the above defined meaning, and the groups R' and R'' represent lower alkyl radicals.

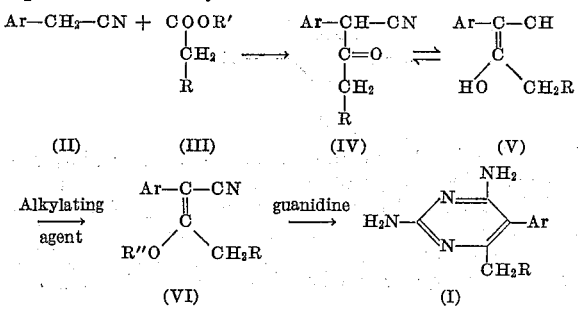

In this reaction sequence, an arylacetonitrile (II) is reacted with an aliphatic ester (III) to give an α-acyl arylacetonitrile (IV) which is tautomeric with the α-aryl-β-hydroxy-β-alkylacrylonitrile form (V). If the latter is reacted with an alkylating agent such as an alkyl diazo compound or an orthoester, the α-aryl-β-alkoxy-β-alkyl-acrylonitrile (VI) so formed may be readily reacted with guanidine to give the pyrimidine (I).

It has now been found that the α-aryl-β-alkoxy-β-alkyl-acrylonitriles of Formula VI may be made directly from the arylacetonitriles (II), by reacting the latter with a suitable orthoester.

According to the present invention, a process for the manufacture of acrylonitriles of the general Formula VI comprises reacting an arylacetonitrile of Formula II with an orthoester of the general Formula VII.

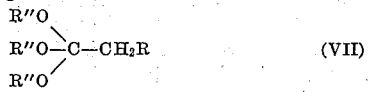

In this formula R has the above defined meaning, and R'' is, as already stated, a lower alkyl group having from one to four carbon atoms, preferably from two to four carbon atoms. It has been found when R'' is ethyl, optimum results are obtained.

In carrying out the process of the present invention, the reactants may simply be mixed and heated under reflux. However, the rate of reaction is limited by the temperature obtainable under these conditions. A higher reaction rate may be obtained by adding the orthoester (which is the lower boiling reactant) in small portions at intervals to the heated arylacetonitrile. In this way, a higher reaction temperature may be used with a resulting decrease in the time required to complete the reaction. During the reaction, an alcohol R''OH is formed which is distilled off as it is formed. At the end of the reaction the acrylonitrile may be crystallised from the reaction liquid or unchanged arylacetonitrile may be distilled fractionally under reduced pressure and the remaining acrylonitrile may then be purified or used in the crude state for conversion to pyrimidine. The recovered quantity of arylacetonitrile is available for further use. A high yield of final product, allowing for recovered starting material has been obtained and the process has the advantage of providing a single reaction to obtain a material which previously could only be obtained in two stages.

The invention will now be described with reference to the accompanying examples in which all temperatures are given in degrees centigrade. In these examples, the 2:4-diamino-pyrimidine prepared from the acrylonitrile by reaction of the latter with guanidine is described to provide a characterization of the acrylonitrile itself.

Example 1 p-Chlorophenylacetonitrile (50 g.) and ethyl orthopropionate (30 g.≡0.5 mol.) were heated together under reflux, and the ethyl alcohol formed during the reaction was separated through a short fractionating column. As the orthoester was consumed, the temperature of the refluxing liquid rose and attained 180° after about 20 hours, when a further (30 g.≡0.5 mol.) of ethyl orthopropionate was added in 5 g. portions at intervals so that the temperature did not exceed 185°. After 87 hours the reaction liquid was distilled fractionally (12 mm. pressure) to give unchanged p-chlorophenylacetonitrile (25.1 g.) together with the residual crude α-p-chlorophenyl-β-ethoxy-β-ethylacrylonitrile (35.4 g.). This acrylonitrile is an oil which, when heated with a solution of guinidine (prepared from the hydrochloride (25 g.) and ethanolic sodium ethoxide) under reflux for 18 hours, gave prisms (28.3 g.) of 2:4-diamino-5-p-chlorophenyl-6-ethylpyrimidine of melting point 234–236°.

Example 2 p-Chlorophenylacetonitrile (30 g.) and ethyl orthoacetate (20 g.+20 g.) were reacted together in the manner of Example 1. After 65 hours, the reaction liquid was set aside at 0° for two days to give crystals (6.0 g.) of α-p-chlorophenyl-β-ethoxy-β-methylacrylonitrile, melting point 113–115° identical with the material produced by the action of ethyl or the esters on α-acetyl-p-chlorophenyl acetonitrile. Distillation of the liquors gave unchanged p-chlorophenylacetonitrile (17 g.) and a residual dark oil (14.9 g.) which, by refluxing with a slight excess of alcoholic guanidine, gave 2:4-diamino-5-p-chlorophenyl-6-methylpyrimidine (5.5 g.), melting point 266–267°.

Example 3

3:4-dichlorophenylacetonitrile (30 g.) was reacted with ethyl orthopropionate (20 g.+15 g.) in the manner of Example 1. After 24 hours the small quantity of unchanged orthoester was distilled (12 mm. pressure) from the reaction liquid, containing the α-(3:4-dichlorophenyl)-β-ethylacrylonitrile and to this liquid a solution of guanidine (prepared from the hydrochloride (20 g.) and ethanolic sodium ethoxide) was then added. The mixture was refluxed for 20 hours to give 2:4-diamino-5-(3':4'-dichlorophenyl) - 6 - ethylpyrimidine (25.1 g.), melting point 235–236°.

Example 4 p-Chlorophenylacetonitrile (30 g.) and isobutyl orthopropionate (25 g.+40 g.) were reacted together in the manner of Example 1, except that the temperature of the reaction liquid was allowed to rise to, but not exceed 220°. After 22 hours, the reaction liquid was distilled fractionally (12 mm. pressure) to give unchanged p-chlorophenylacetonitrile (16.3 g.) and residual crude α-p-chlorophenyl-β-isobutoxy - β - ethylacrylonitrile (22.8 g.). The latter, by refluxing with a solution of guanidine (prepared from the hydrochloride (13 g.) and ethanolic sodium ethoxide) for 22 hours, give 2:4-diamino-5-p-chlorophenyl-6-ethylpyrimidine (15.1 g.) melting point 234–236°.

Example 5

To heated p-chlorophenylacetonitrile (50 g.), ethyl orthopropionate (60 g.) was added in small portions at intervals so that the temperature of the refluxing liquid did not rise above 230° nor fall below 220°. Reaction was complete after 5 hours. From the reaction liquid, containing α-p-chlorophenyl-β-ethoxy-β-ethylacrylonitrile following the procedure of Example 1, unchanged p-chlorophenylacetonitrile (25 g.) and 2:4-diamino-5-p-chlorophenyl-6-ethylpyrimidine (28 g.), melting point 234–236°, were obtained.

Example 6

When 3:4-dichlorophenylacetonitrile (10 g.) and ethyl orthopropionate (12.5 g.) were reacted together in the manner of Example 5, but at a temperature of 200–210°, reaction was complete after 3 hours. The reaction liquid was then cooled, seeded, and set aside at 0°. The colorless, long prismatic needles of α-3:4-dichlorophenyl-β-ethoxy-β-ethylacrylonitrile (5.3 g.), melting point 89–90°, were collected, washed with a little cold alcohol, and the combined liquors heated on the steam-bath under reduced pressure. The residual oil was heated under reflux with a slight excess of alcoholic guanidine to give 2:4-diamino-5-(3:4-dichlorophenyl) - 6 - ethylpyrimidine (2.0 g.), melting point 235–236°.

Example 7

When phenylacetonitrile (24 g.) was heated with ethyl orthopropionate (36 g.) in the manner of Example 5, reaction was slow and required 20 hours for its completion. Unchanged phenylacetonitrile (19.8 g.) was distilled (12 mm. pressure) fractionally from the reaction liquid, and the residual oily α-phenyl-β-ethoxy-β-ethylacrylonitrile (5.2 g.) heated under reflux with alcoholic guanidine to give 2:4-diamino-5-phenyl-6-ethylpyrimidine (2.8 g.), melting point 242–243°.

Example 8 p-Chlorophenylacetonitrile (20 g.) and methyl ortho-n-valerate (23.6 g.) were heated together in the manner of Example 5. After 14 hours the reaction liquid was heated in vacuo to remove any unchanged orthoester, then dissolved in hot alcohol (30 ml.) and set aside. The crystals (5.75 g.), melting point 148–151° (melting point 152–153° after purification), of by-product which separated were collected and washed with alcohol. The combined liquors were distilled at 12 mm. pressure, giving unchanged p-chlorophenylacetonitrile (3.7 g.), and then at 0.1 mm. pressure to give yellow oily α-p-chlorophenyl-β-methoxy-β-n-butylacrylonitrile (4.4 g.) boiling point 120–180°. This oil, heated with alcoholic guanidine, gave 2:4-diamino-5-p-chlorophenyl-6-n - butylpyrimidine (2.9 g.), melting point 208–209°.

Example 9

The reaction of p-chlorophenylacetonitrile (20 g.) with methyl orthopropionate (19.5 g.), when heated together in the manner of Example 5, was complete after 12 hours. The reaction liquid containing α-p-chlorophenyl-β-methoxy-β-ethylacrylonitrile was worked up in the manner of Example 8, giving crystals (2.6 g.) of a by-product, melting point 192–193° (melting point 194–195° after purification), unchanged p-chlorophenylacetonitrile (5.9 g.) and 0.1 g. of 2:4-diamino-5-p-chlorophenyl-6-ethylpyrimidine, melting point 234–236°.

Example 10 p-Chlorophenylacetonitrile (20 g.) and isobutyl ortho-n-valerate (39 g.) were heated together in the manner of Example 5. After 5½ hours, the reaction liquid containing α-p-chlorophenyl-β-isobutoxy-β-n-butylacrylonitrile was worked up, giving unchanged p-chlorophenyl-acetonitrile (13.5 g.) and 2:4-diamino-5-p-chlorophenyl-6-n-butylpyrimidine (6.9 g.), melting point 208–209°.

Example 11 p-Chlorophenylacetonitrile (25 g.) and ethyl ortho-n-butyrate (33 g.) were heated together in the manner of Example 5. After 9 hours the reaction liquid was worked up, giving unchanged p-chlorophenylacetonitrile (17.6 g.) and 2:4-diamino-5-p-chlorophenyl-6-n - propylpyrimidine (7.04 g.) melting at 176–177.5°.

Example 12 p-Chlorophenylacetonitrile (20 g.) and ethyl ortho-n-caproate (30 g.) were reacted together and after 14 hours the reaction liquid was worked up, giving unchanged p-chlorophenylacetonitrile (15.6 g.) and 2:4-diamino-5-p-chlorophenyl-6-n-amylpyrimidine (4.99 g.), melting at 189–190°.

What is claimed is:

1. A process for the manufacture of acrylonitriles of the general formula

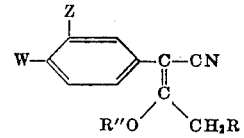

in which R is selected from the class consisting of hydrogen and alkyl groups of from 1 to 4 carbon atoms, W and Z are selected from the class consisting of hydrogen and halogen atoms and R'' is an alkyl group having from one to four carbon atoms, said process comprising reacting an arylacetonitrile of the general formula

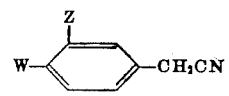

with an orthoester of the general formula

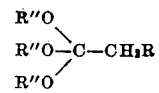

2. A process as set forth in claim 1 wherein R'' is an alkyl group having 2 carbon atoms.

3. A process as set forth in claim 1 wherein R'' is an alkyl group having 3 carbon atoms.

4. A process as set forth in claim 1 wherein R'' is an alkyl group having 4 carbon atoms.

5. A process as set forth in claim 1, in which the reactants are heated together under reflux conditions.

6. A process as set forth in claim 1, wherein the orthoester is added in small portions at intervals to the heated acetonitrile.

References Cited in the file of this patent

UNITED STATES PATENTS 2,594,309   Hitchings _____ Apr. 29, 1952